(12) United States Patent
Pettersson

(10) Patent No.: US 7,500,319 B2
(45) Date of Patent: Mar. 10, 2009

(54) MEASUREMENT PROBE FOR USE IN COORDINATE MEASURING MACHINES

(75) Inventor: Bo Pettersson, London (GB)

(73) Assignee: Hexagon Metrology AB, Nacka Strand (SE)

( * ) Notice: Subject to any disclaimer, the term of this patent is extended or adjusted under 35 U.S.C. 154(b) by 0 days.

(21) Appl. No.: 11/630,672

(22) PCT Filed: Jun. 20, 2005

(86) PCT No.: PCT/SE2005/000957

§ 371 (c)(1),
(2), (4) Date: May 4, 2007

(87) PCT Pub. No.: WO2006/001756

PCT Pub. Date: Jan. 5, 2006

(65) Prior Publication Data

US 2008/0034601 A1    Feb. 14, 2008

(30) Foreign Application Priority Data

Jun. 28, 2004 (SE) .................................... 0401660

(51) Int. Cl.
*G01B 5/00* (2006.01)
*G01B 5/004* (2006.01)
*G01B 7/004* (2006.01)

(52) U.S. Cl. .......................................... 33/559; 33/556

(58) Field of Classification Search .................. 33/556, 33/558, 559, 561, 644
See application file for complete search history.

(56) References Cited

U.S. PATENT DOCUMENTS 5,074,052 A * 12/1991 McMurtry .................... 33/559
5,604,593 A * 2/1997 McMurtry ................... 356/496
5,715,729 A   2/1998 Toyama et al. ........... 74/490.03
5,743,020 A   4/1998 Sheldon ........................ 33/559
5,887,356 A * 3/1999 Sheldon ........................ 33/556
5,909,939 A * 6/1999 Fugmann ...................... 33/503
6,226,884 B1* 5/2001 McMurtry .................... 33/557
6,523,273 B1* 2/2003 Nishioki et al. ............... 33/559
6,678,966 B1* 1/2004 Koga et al. .................... 33/558
6,681,495 B2* 1/2004 Masayuki et al. ............. 33/501
7,040,033 B2* 5/2006 Zhu et al. ...................... 33/502
7,228,641 B2* 6/2007 Hunter et al. ................. 33/556
7,356,937 B2* 4/2008 Nishibashi et al. ............ 33/502

FOREIGN PATENT DOCUMENTS

DE    3506892 A1    2/1985
DE    4300026 A1    1/1993

* cited by examiner

Primary Examiner—G. Bradley Bennett
Assistant Examiner—Amy Cohen Johnson
(74) Attorney, Agent, or Firm—Young & Thompson

(57) ABSTRACT

A measurement probe for use in coordinate measuring machines, which probe comprises a base (1) connected to a coordinate measuring machine, a measurement tip (4) and a ball (5) arranged at the first end of the measurement tip (4). The measurement tip (4) is supported at its second end with the aid of at least three rigid supports (2) supported by the base (1), whereby the supports (2) are connected to the measurement tip by means of spherical connections and where the supports (2) can be displaced along their longitudinal directions relative to the base (1). The supports (2) are arranged such that they pass through the base (1), and can be displaced along their longitudinal directions by protruding to a greater or lesser degree on the side of the base (1) that is opposite relative to the measurement tip holder (3).

9 Claims, 2 Drawing Sheets

MEASUREMENT PROBE FOR USE IN COORDINATE MEASURING MACHINES

Figure 1:
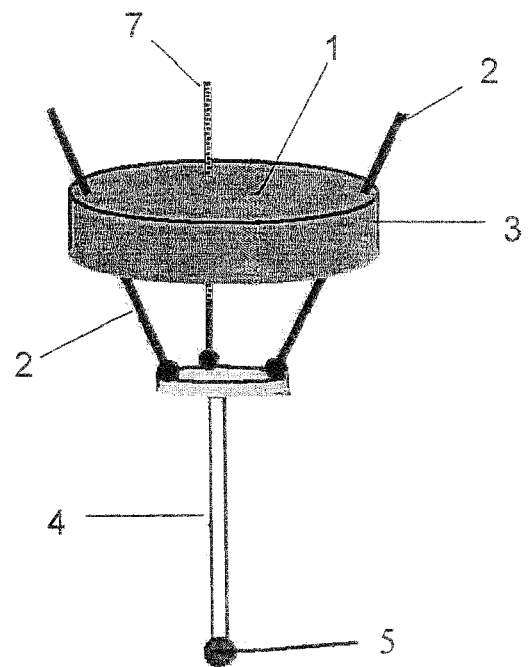

The present invention relates to a measurement probe for use in coordinate measuring machines.

Measurement probes are used in coordinate measuring machines as the device that is intended to make contact with the measurement object that is to be measured, and the device is arranged on the end of a mobile arm such that it produces a signal when brought into contact with the measurement object, which gives rise to the registration of the position of the probe in a coordinate system. Alternatively, an optical device, i.e. a contact-free device, may be used, in order to produce the above-mentioned signal when placed in an exact position relative to the measurement object.

The probe comprises a measurement tip, that demonstrates a free end where a ball is normally arranged for contact with the measurement object. The measurement tip is so mounted in the probe that the contact of the ball with the measurement object gives a displacement of the mounting of the measurement tip, the size and direction of which displacement can be determined, such that the exact point of contact between the ball and the measurement object can be determined.

In existing coordinate measuring machines comprising such measurement probes the mounting of the measurement tip is normally constructed such that a number of elements are connected in sequence, and it is possible to bend these elements only in one direction that is perpendicular to the elements in order together to give the measurement tip the possibility to be displaced somewhat in a freely defined direction. The displacement is detected in order to prevent further displacement of the probe, and its current position and, where required, the displacement of the measurement tip are recorded in order to calculate the current position of the measurement object. An example of such a measurement probe can be found in the patent document GB 1551218.

One problem with the above-described type of measurement probe is that the errors that they record are accumulated and in this way give rise to serial errors.

It is therefore a purpose of the present invention to achieve a new measurement probe that gives the possibility of more exact measurements, and where the above-described type of source of error can be removed.

The above-mentioned purpose is achieved with a measurement probe according to the invention where the probe comprises a base connected to a coordinate measuring machine, a measurement tip holder and a measurement tip that is supported by this holder, where the measurement tip holder is supported by the base with the aid of at least three rigid supports, whereby the supports are connected to the measurement tip holder by means of spherical connections and where the supports can be displaced along their longitudinal directions relative to the base such that the angle between the measurement tip holder and the base can be altered, and where the supports are arranged such that they pass through the base, and can be displaced along their longitudinal directions by protruding to a greater or lesser degree on the side of the base that is opposite relative to the measurement tip holder.

The supports are arranged in one embodiment such that they are provided with driving means such that the measurement tip holder, and thus the measurement tip with its ball, can be adjusted by means of self-displacement.

The measurement tip according to second embodiment comprises a physical measurement tip with a ball arranged at the end of it.

The measurement tip according to a further embodiment is constituted by a virtual tip, with an optical sensor arranged to detect the proximity of the virtual tip to a measurement object. Such an optical sensor may be, for example, a laser, a CCD camera, or similar.

More generally, the invention involves the connection of six supports between the base and the measurement tip holder, and the possibility that these supports can be individually displaced relative to the base. The measurement tip holder in this case is designed in such a manner that each support, or combination of supports, controls the six degrees of freedom that are available for the measurement tip holder $(x,y,z,\phi,\theta,\eta)$. The invention will, however, here be described in a number of simplified, but not limiting, designs.

Figure 2:
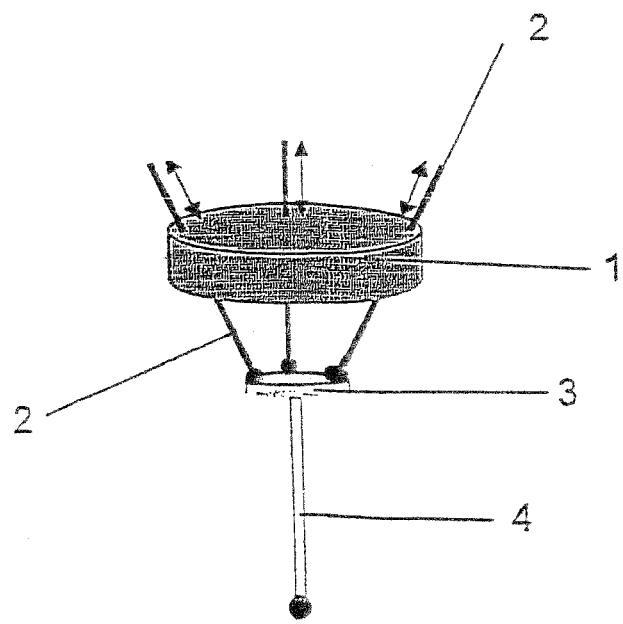
Figure 3:
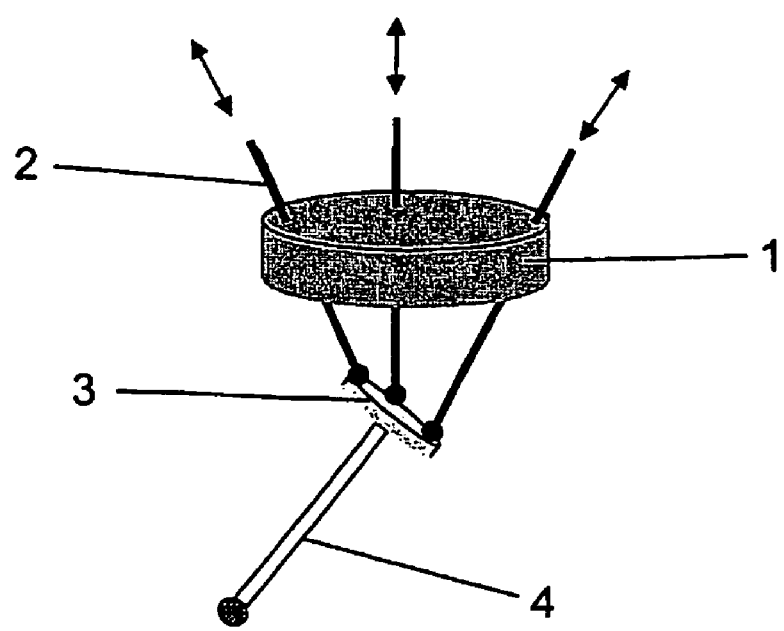

The invention will now be described in more detail in the form of a pair of embodiments, illustrated by the attached drawings, where FIG. 1 shows a general view of a measurement probe in perspective, FIG. 2 shows a perspective view of a design of the measurement probe according to the invention with supports arranged such that they pass through the base and can be displaced along their longitudinal directions, and FIG. 3 shows a principle view equivalent to that shown in FIG. 2, but here the measurement tip and thus the measurement tip holder are obliquely positioned.

Thus, FIG. 1 shows schematically a measurement probe comprising a base 1, three supports 2, here having the form of three rods, which supports support a measurement tip holder 3 with the aid of spherical joints.

The measurement tip holder 3 supports in turn a measurement tip 4 that is equipped at its free end with a ball 5, which is the element of the measurement probe that it is intended that it should be possible to bring into contact with a measurement object. Due to the spherical joints, which may consist of, for example, a ball arranged at the end of the rod 2, which ball is mounted in an internally spherical housing on the measurement tip holder 3, the rods 2 can freely adopt any angle relative to the measurement tip holder 3.

A measuring system is connected to measure the position of the measurement tip holder, and thus the position of the ball, relative to a reference point on, for example, the base 1, in order to determine the position of the ball of the probe when it is in contact with a measurement object. The measuring system, however, is not critical in itself for the invention; it may be chosen by one skilled in the arts in this technical area.

FIG. 2 shows an embodiment of the measurement probe according to the invention, where the supports 2 that support the measurement tip holder 3 with the measurement tip 4 and the ball 5 are so arranged that they pass through the base 1, and protrude above its upper surface, i.e. on that side of the base that is opposite the measurement tip holder 3. The supports 2 are so arranged in the base 1 that they can be displaced, within certain limits, along their longitudinal directions as is shown by the arrows L1, L2 and L3, and protrude to a greater or lesser degree above the upper surface of the base 1. When the ball 5 makes contact with an object, thus, each individual support 2 can be displaced relative to the base independently of the other supports. Thus, the positions of the supports 2 relative to the base 1 can be determined by, for example, placing a measurement scale 7 (See FIG. 1) on them, and the exact position of the ball 5 in this way can also be calculated.

An optical measuring system, for example, may be used to measure the position of the measurement tip holder 3, which system measures the distance from a starting point at the base 1. Such a measurement may, for example, take place between the base and a number of fixed points on the measurement tip holder 3. The distances between these fixed points on the measurement tip holder 3 and the ball 5 are always the same, since no deformation of the measurement tip or the ball takes place when the ball is in contact with a measurement object, since all deformations are absorbed by the supports 2.

It is also possible to arrange separate measuring rods between the measurement tip holder 3 and the base 1. It is in this case appropriate that these measuring rods are designed and arranged in a manner equivalent to that which has been described for the supports in association with the embodiment according to FIG. 2, where these measuring rods would thus pass through the base, and it would be possible to displace them along their longitudinal directions, whereby the measuring rods would comprise a measurement scale 7 such that their positions relative to the base 1 can be determined, and in this way the position of the ball 5 can also be calculated.

Thus a measurement probe according to the invention makes it possible to achieve a very rigid arrangement for the measurement tip and the ball, since deformations are absorbed by other elements, whereby a very accurate determination of the position of the ball can be carried out.

Although the invention has been described here as if the measurement tip is constituted by a physical tip with a ball mounted at the end of it, it is clear that this physical tip can, as has been previously mentioned, be replaced by a virtual tip, where measurements are made against a point that lies at a distance from the measurement tip holder, where this point is fixed relative to the measurement tip holder.

The invention claimed is:

1. A measurement probe for use in coordinate measuring machines, which measurement probe comprises a base (1) connected with a coordinate measuring machine, a measurement tip holder (3) and a measurement tip (4) supported by the measurement tip holder, characterized in that the measurement tip holder (3) is supported by the base (1) with the aid of at least three rigid supports (2), whereby the supports (2) are connected with the measurement tip holder (3) by means of spherical connections and where the supports (2) can be displaced along their longitudinal directions relative to the base (1) such that the angle of the measurement tip holder (3) relative to the base (1) can be changed, and whereby the supports (2) are arranged such that they pass through the base (1) and can be displaced along their longitudinal directions (L1, L2, L3) by protruding to a greater or lesser degree through the side of the base (1) that is opposite relative to the measurement tip holder (3).

2. The measurement probe according to claim 1, characterized in that the supports (2) comprise a measurement scale such that their positions relative to the base (1) can be determined and in that the position of the measuring tip (4) can in this way be calculated.

3. The measurement probe according to claim 2, characterized in that the measurement tip (4) comprises a physical measuring tip (4) with a ball (5) arranged in the end of the measurement tip (4).

4. The measurement probe according to claim l, wherein the supports comprise separate measurement rods arranged between the measurement tip holder (3) and the base (1) that can be displaced along their longitudinal directions and pass through the base, whereby the measurement rods comprise a measurement scale such that their positions relative to the base (1) can be determined and in that the position of the measuring tip (4) can in this way be calculated.

5. The measurement probe according to claim 4, characterized in that the measurement tip (4) comprises a physical measuring tip (4) with a ball (5) arranged in the end of the measurement tip (4).

6. The measurement probe according to claim 1, characterized in that the measurement tip (4) comprises a physical measuring tip (4) with a ball (5) arranged in the end of the measurement tip (4).

7. The measurement probe according to claim 1, characterized in that the measurement tip is constituted by a virtual tip, with an optical sensor arranged to detect the proximity of the virtual tip to a measurement object.

8. The measurement probe according to claim 7, characterized in that the measurement tip (4) comprises a physical measuring tip (4) with a ball (5) arranged in the end of the measurement tip (4).

9. The measurement probe according to claim 1, where in at least three rigid supports (2) are longitudinally rigid.

* * * * *